Aug. 27, 1963  M. LOPEZ-HENRIQUEZ  3,101,644
MOTION PICTURE PROJECTOR SYSTEM WITH 3-DIMENSIONAL EFFECT
Filed April 28, 1958  6 Sheets-Sheet 1
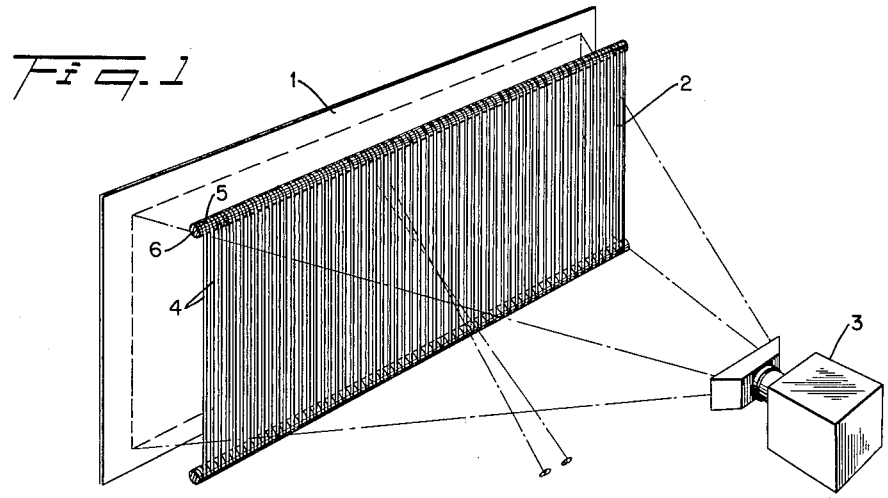
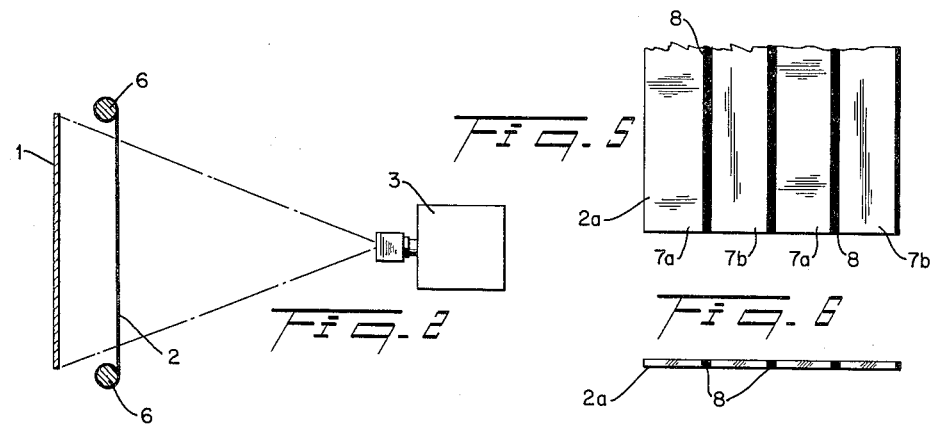
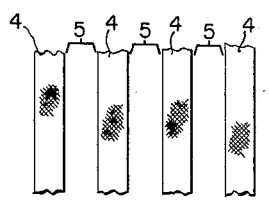
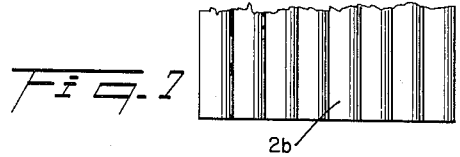
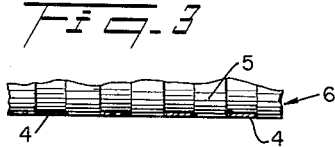
INVENTOR.
MIGUEL LOPEZ-HENRIQUEZ
BY
ATTORNEY

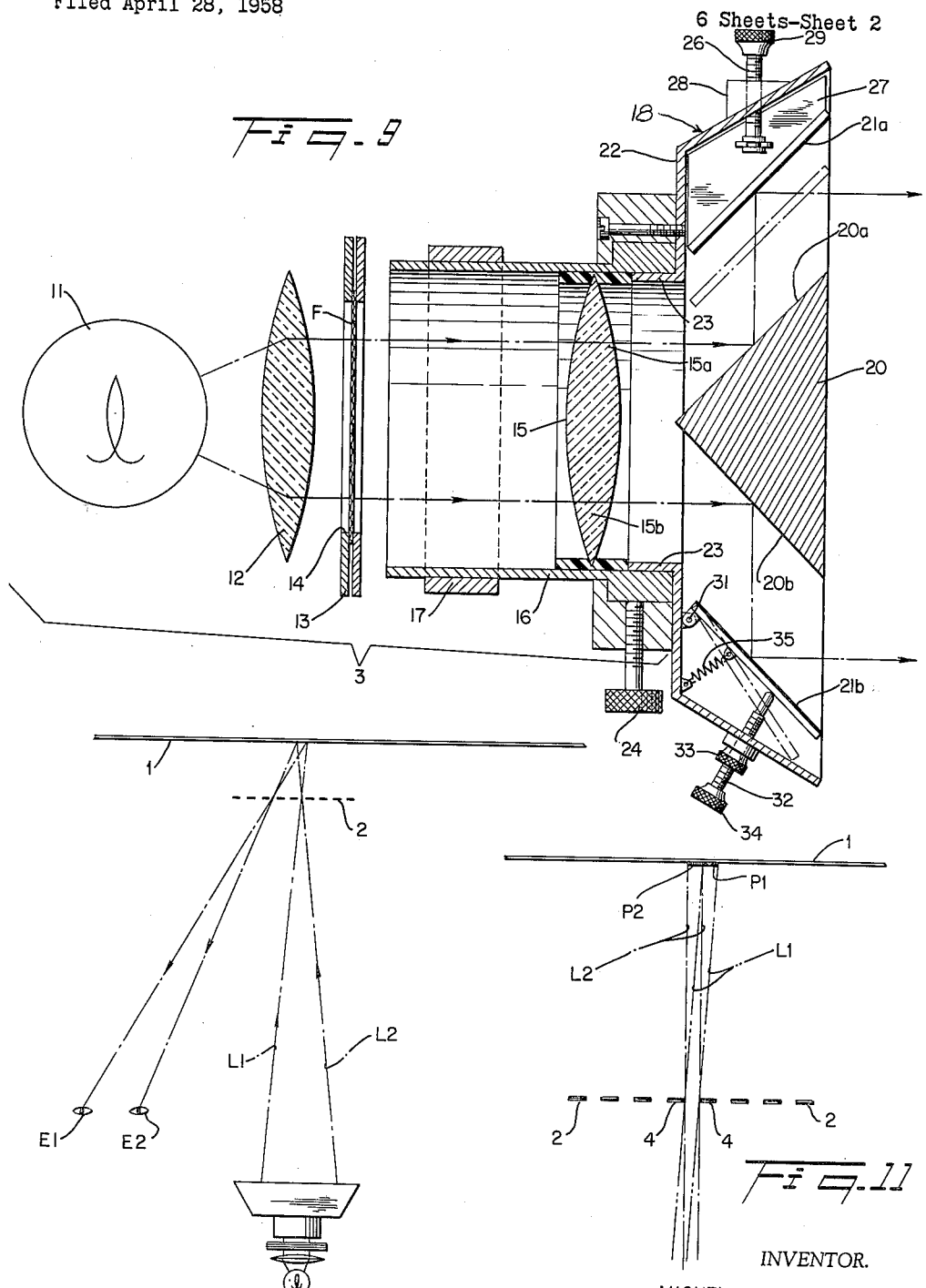

Aug. 27, 1963       M. LOPEZ-HENRIQUEZ       3,101,644
MOTION PICTURE PROJECTOR SYSTEM WITH 3-DIMENSIONAL EFFECT
Filed April 28, 1958                         6 Sheets-Sheet 3
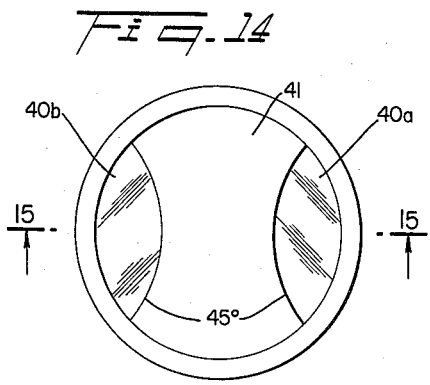
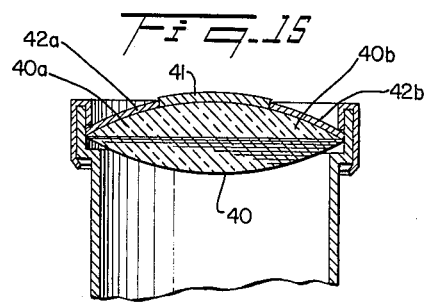
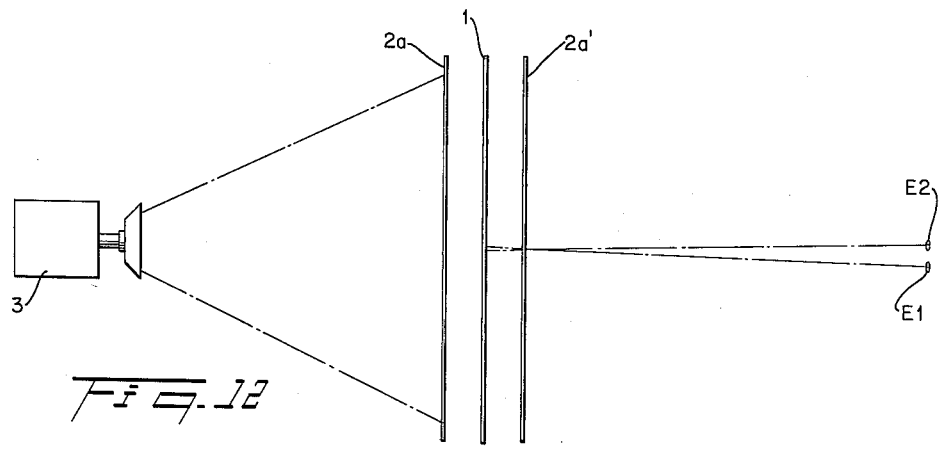
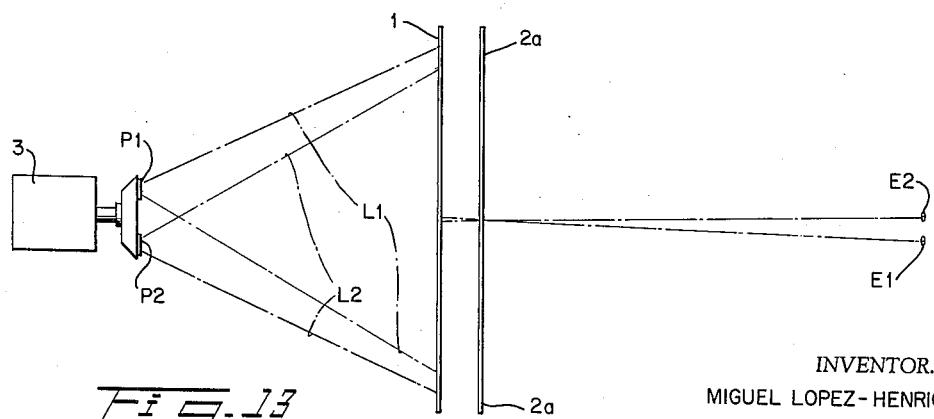
INVENTOR.
MIGUEL LOPEZ-HENRIQUEZ
BY
*Robert E. Burns*
ATTORNEY

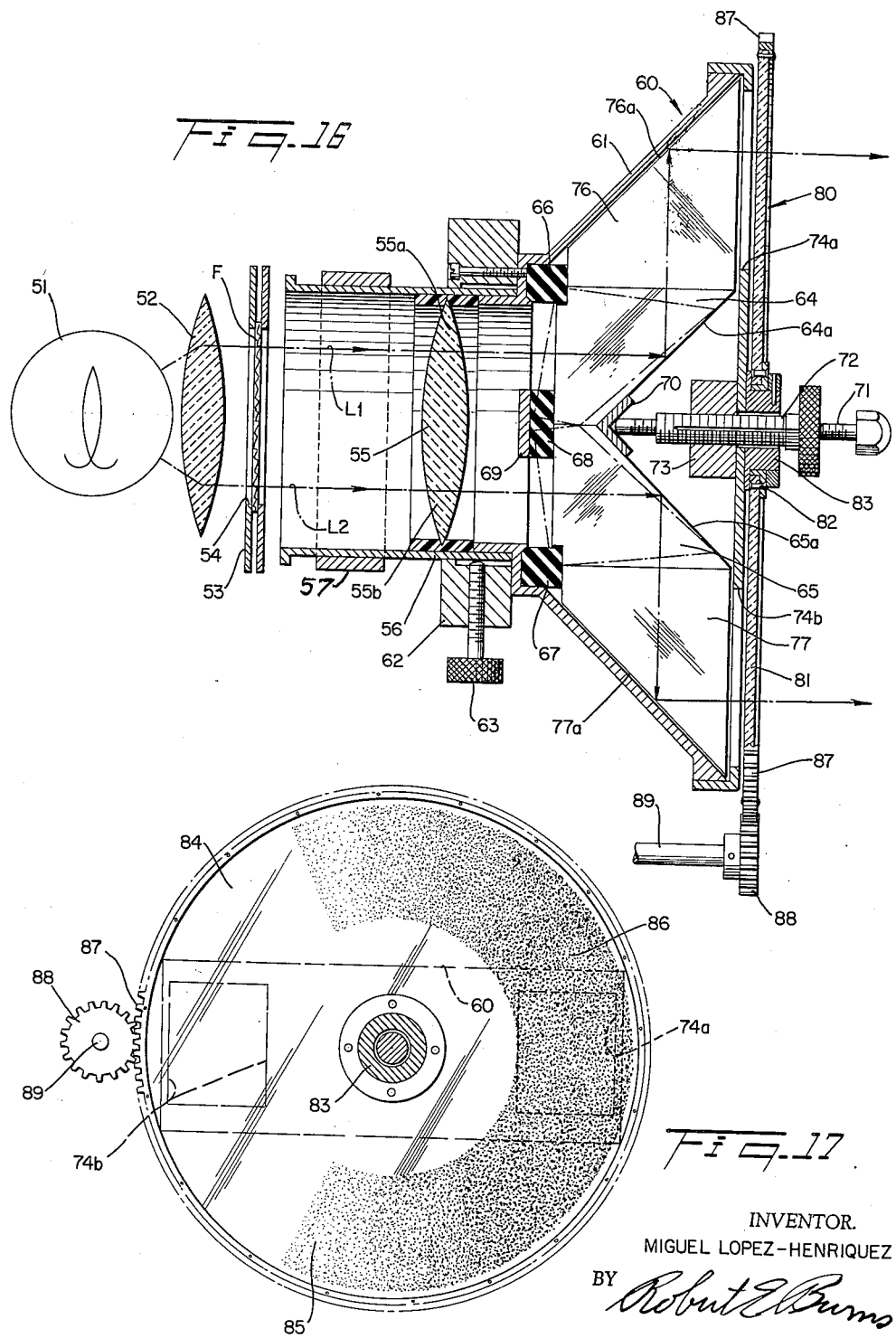

Aug. 27, 1963    M. LOPEZ-HENRIQUEZ    3,101,644
MOTION PICTURE PROJECTOR SYSTEM WITH 3-DIMENSIONAL EFFECT
Filed April 28, 1958    6 Sheets-Sheet 5
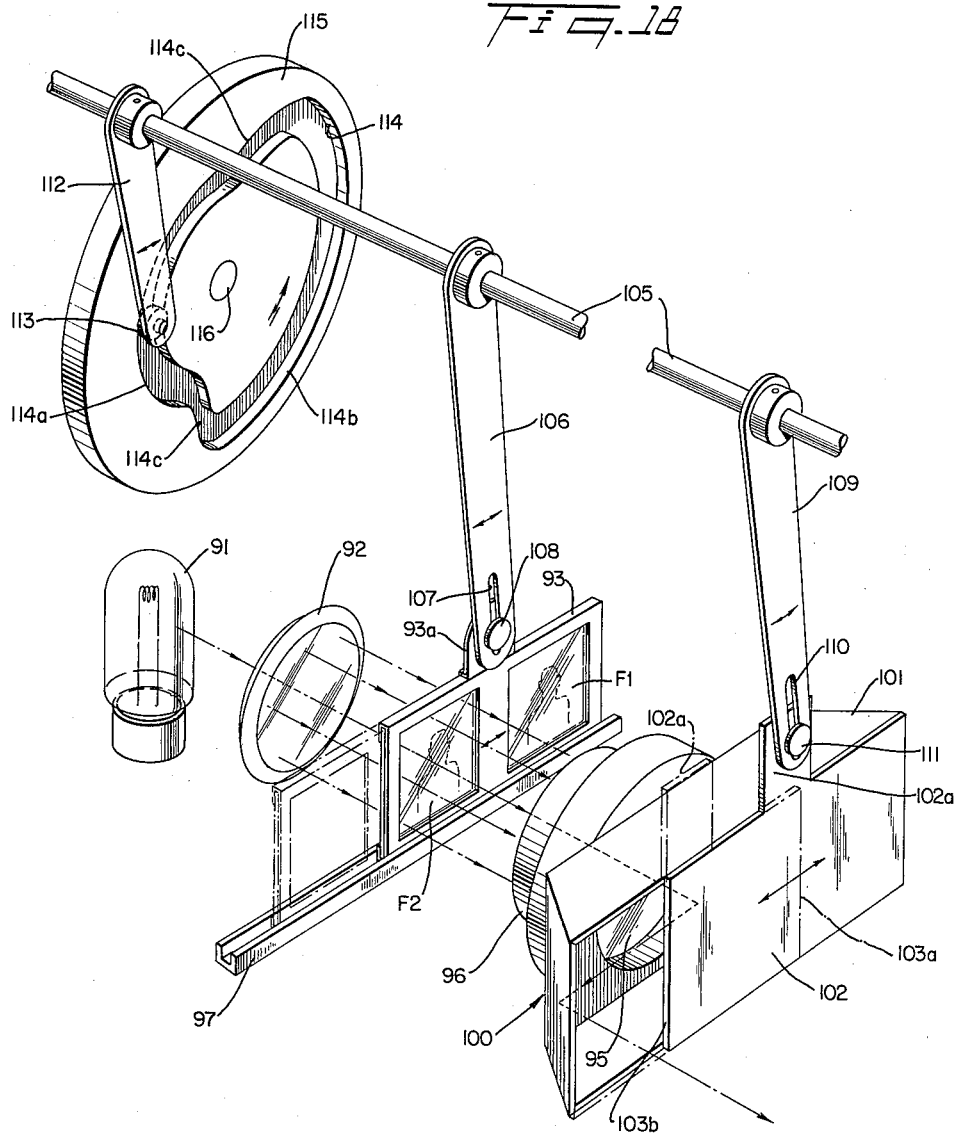
INVENTOR.
MIGUEL LOPEZ-HENRIQUEZ
BY
ATTORNEY

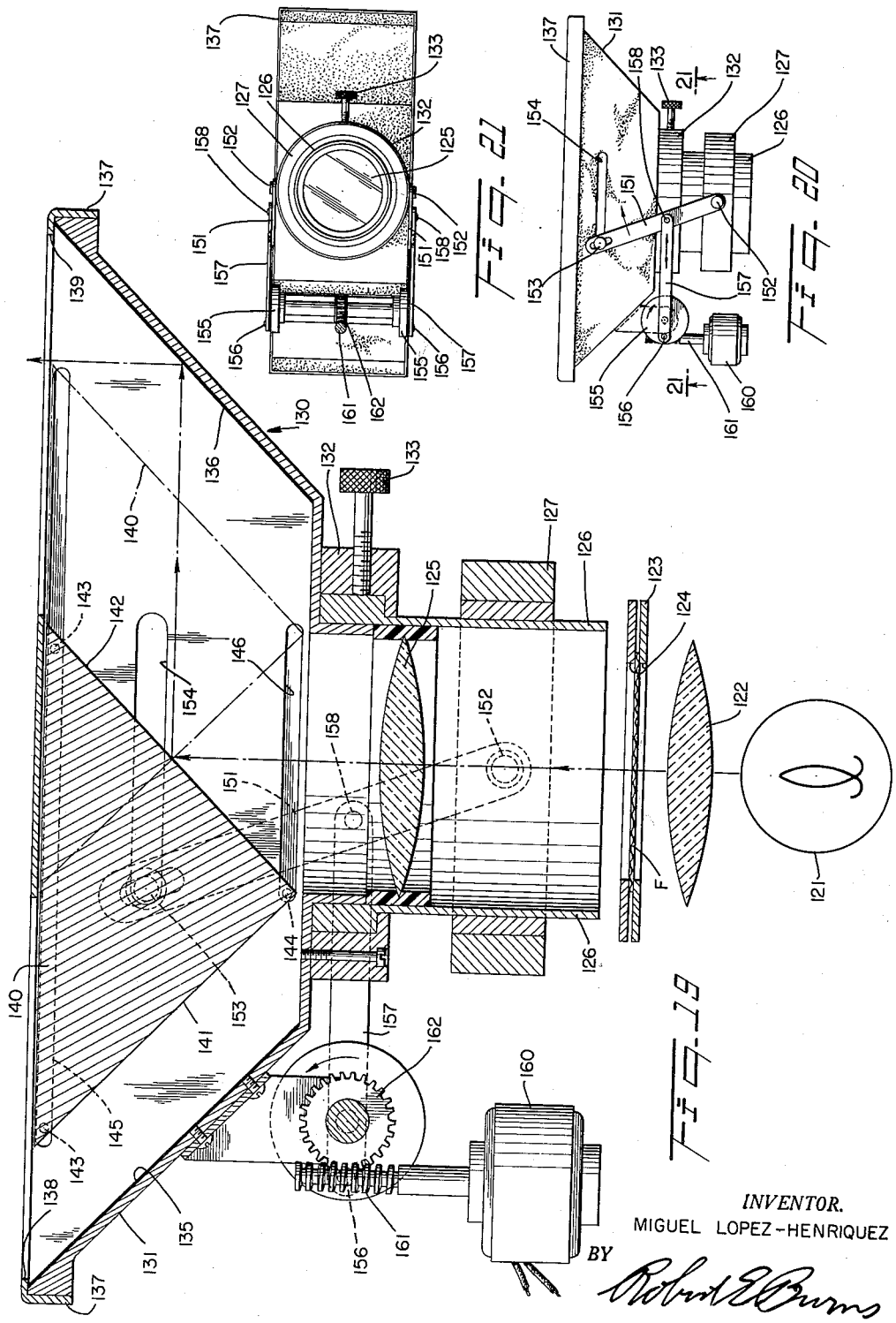

United States Patent Office 3,101,644
Patented Aug. 27, 1963

3,101,644
MOTION PICTURE PROJECTOR SYSTEM WITH 3-DIMENSIONAL EFFECT
Miguel Lopez-Henriquez, Caracas, Venezuela
(240 W. 73rd St., New York 23, N.Y.)
Filed Apr. 28, 1958, Ser. No. 732,772
4 Claims. (Cl. 88—16.6)

The present invention relates to a motion picture projector system for obtaining a 3-dimensional effect from single image films. This application is a continuation-in-part of my copending application, Serial No. 370,058, filed July 24, 1953, now abandoned.

The motion picture projection system in accordance with the present invention makes possible important economies in taking and projecting 3-dimensional motion pictures. With a conventional stereoscopic system, it is necessary to have two cameras or a special dual camera capable of taking two frames simultaneously, one frame representing a view of the subject as seen with the left eye and the other frame representing a view of the same subject as seen with the right eye. Likewise, projection of such film requires a dual projector or two projectors operated in synchronism with one another. Since two frames are required for each exposure, a stereoscopic system requires twice as much film as is required for ordinary single image pictures. The system in accordance with the present invention requires only a single camera and single projector and uses only half the amount of film that is required by the usual stereoscopic system.

A further important feature of the present invention is that thousands of films which have been taken by conventional single image cameras may be viewed as if they were 3-dimensional. The system in accordance with the present invention is applicable to conventional films that have already been taken as well as to pictures taken in the future.

In an apparently single image picture there are recorded many different views of the same scenery or other subject taken from different angles. This is attributable to the fact that the camera lens is of such physical size that one portion receives different light rays than another portion. For example if the diameter of the lens is approximately equal to the distance between the human eyes, i.e. about 2½ inches, one side of the lens receives light rays which would have been seen by one eye while the opposite side receives light rays which would have been seen by the other eye. Lenses of smaller size act similarly although the differences of the pictures received by the respective sides are not as great. It may further be noted that each portion of a lens receives and transmits substantially the whole scene just as does the entire lens. This will be evidenced when it is considered that if the lens of an ordinary camera is closed down to its smallest aperture, it still records substantially the entire scene before it with, however, a diminution of light intensity.

In projecting a picture in accordance with the present invention, the foregoing phenomena are reversed. One side portion of the lens of the projector views the picture from one aspect while the other side portion of the projector lens views the same picture from a different aspect. The two views thus obtained are separately projected on a screen, preferably through an optical system that spreads the two light beams laterally to obtain a greater separation so that they are projected on the screen from different angles. The invention further comprises a special screen and grid combination by means of which one eye of an observer viewing the picture sees an image projected by the light beam from one side portion of the lens while the other eye of the observer sees an image projected by the light beam through the other side portion of the projector lens. Although each portion of the projector lens projects the entire picture, it will be understood that since the diameter of the projector lens is usually equal to or greater than the width of the frame of the film, the angular relation of the side portions of the projector lens to the frame are different. Thus it will be noted that the right hand side of the lens is nearer the right hand side of the frame and on a line approximately perpendicular to the right hand side of the frame but at an angle to the left hand side of the frame. Conversely, the left hand side of the lens is nearer the left hand side of the frame and on a line approximately perpendicular to the left hand side of the frame but at an angle to the right hand side of the frame. Hence while each lens portion projects the entire picture it will be seen that the images projected are not exactly identical but differ slightly from one another. These slight differences when projected and viewed in accordance with the present invention give an illusion of depth so that the picture appears to be 3-dimensional even though it is projected from a single frame.

A further advantage of the preferred system in accordance with the present invention is that it avoids the expense and inconvenience of requiring members of the audience to wear special glasses such as those which have heretofore been needed.

Whether or not the foregoing explanation completely and accurately sets forth the theory of operation, it has been found through actual experience that the novel system in accordance with the invention is a very definite illusion of depth and a 3-dimensional effect in projecting pictures from single image film. The invention will be more fully understood from the following description and claims in conjunction with the accompanying drawings in which:

FIG. 1 is a schematic perspective view illustrating a preferred embodiment of a projection system in accordance with the invention.

FIG. 2 is a schematic elevation of the system shown in FIG. 1.

FIG. 3 is an approximately full scale fragementary elevational view of a small portion of a grating or grid of the system shown in FIGS. 1 and 2.

FIG. 4 is a fragmentary horizontal section through the grid shown in FIG. 3.

FIG. 5 is an approximately full scale fragmentary elevational view of another form of grid.

FIG. 6 is a fragmentary horizontal section of the grid shown in FIG. 5.

FIG. 7 is an approximately full scale fragmentary elevational view of another form of grid comprising vertically extending lenses.

FIG. 8 is a horizontal section of the grid shown in FIG. 7.

FIG. 9 is a schematic horizontal section of the projector of the system shown in FIG. 1.

FIG. 10 is a schematic plan view of the system shown in FIG. 1 illustrating the operation of the system.

FIG. 11 is a fragmentary schematic horizontal section on a larger scale illustrating the operation of the grid and screen.

FIGS. 12 and 13 are schematic plan views similar to FIG. 10 but illustrating other arrangements of the projector, screen and grid.

FIG. 14 is a front view of a projector lens which may be used either alone or with a light beam separating system as shown in FIG. 9, 16 or 18.

FIG. 15 is a horizontal section taken approximately on the line 15—15 in FIG. 14.

FIG. 16 is a schematic horizontal section similar to FIG. 9 but illustrating a modification of the projector.

FIG. 17 is a front view on a slightly smaller scale of the projector of FIG. 16.

FIG. 18 is a schematic perspective view of a projector for slides.

FIG. 19 is a schematic horizontal section of another projector.

FIG. 20 is a reduced plan of a portion of the projector shown in FIG. 19.

FIG. 21 is a schematic section taken approximately on the line 21—21 in FIG. 20.

The projection system in accordance with the invention as illustrated in FIGS. 1 to 4 comprises a screen 1, a grating or grid 2 and a projector 3. The screen 1 is provided with a white, beaded aluminized or other surface suitable for the projection of a picture. Screens of the kind presently used in motion picture theatres and for home movies are suitable for use in the system illustrated in FIGS. 1 and 2.

The grid 2 shown in FIGS. 1 to 4 comprises a multiplicity of parallel vertically extending narrow strips or bands 4 of substantially opaque light-absorbing material separated from one another by spaces 5 which are substantially equal to the width of the bands 4. The opaque bands 4 may conveniently be formed as lines or stripes on a sheet of glass, plastic or other transparent material. However, as the reflection from such material may be objectionable when the projector is located in front of the screen, i.e. on the same side of the screen as the viewers, as illustrated in FIG. 1, it is preferred to use for such a system a grid in which the bands 4 are strips or ribbons of fabric, plastic, metal or other suitable material extending between supports 6. Preferably the ribbons are sufficiently flexible that they can be rolled up on one or both of the supports when the grid is not in use. Accurate spacing of the ribbons is conveniently obtained by using round supports 6 and by cutting a coarse thread on each of the supports. The spaces between successive convolutions of the thread are of a shallow rectangular cross sectional shape to accommodate the ribbons 4 and the pitch of the thread is equal to twice the width of the ribbon. The ribbon may be applied to the supports by winding it over the upper support and under the lower support, the ribbon being positioned in each instance in the space or groove between successive convolutions of the threads on the supports. After the ribbon has been wound on with uniform tension, it is secured to each of the supports for example by stapling, tacking or gluing and the portions of the ribbon at one side are cut away so as to leave only a single plane or sheet of ribbons extending between the supports as illustrated in FIG. 2. When the ribbons 4 are formed of flexible material, they are kept under sufficient tension to be held straight and uniformly spaced. The tension may be supplied by the weight of the lower support or by suitable struts—which are preferably adjustable—extending between the supports. In the embodiment illustrated in FIGS. 3 and 4 the strips 4 are approximately one-quarter inch wide and spaced one quarter inch apart. They are preferably quite thin so as to avoid blocking light passing through the grid at an angle to the plane of the grid. With a grid of the dimensions illustrated in FIGS. 3 and 4, the distance between the grid 2 and the screen 1 is preferably of the order of 6 feet. The width of the strips 4 and the spacing of the grid from the screen is varied according to the size of the theatre, the distance of the projector from the screen and other factors that will be apparent from the description below of the operation of the system. When the system is used for home movies, the width of strips and the distance between the grid and the screen are preferably less.

In FIGS. 5 and 6 there is shown another form of grid 2a comprising a multiplicity of narrow bands or strips of light polarizing material. Alternate strips 7a are polarized in one direction while intervening strips 7b are polarized in a direction approximately perpendicular to that of strips 7a. In a preferred embodiment, the direction of polarization of the strips is approximately 45° to their length. Between successive polarizing strips 8a and 8b there are preferably provided opaque separator lines or strips 8 which are substantially narrower than the polarizing strips. The width of the polarizing strips 7a and 7b is preferably of the order of one sixteenth inch to one inch, the narrower strips being used for home movies and the wider strips for larger theatres. When narrower strips are used, the distance between the screen and the grid is of the order of four to eight inches. With wider strips for use in larger theatres the distance is correspondingly greater.

In FIGS. 7 and 8 there is shown a third form of grid comprising a multiplicity of vertically extending cylindrical lenses 9 disposed edge-to-edge. For convenience of manufacture the lenses may be molded integrally with one another as shown in FIG. 8. When the grid is of large size it may conveniently be made in a plurality of sections fitting together edge-to-edge. The lenses 9 are preferably quite narrow, for example one quarter inch wide, although wider lenses may be used in larger theatres. The distance between the grid and the screen is approximately equal to the focal length of the lenses so that a picture projected by the projector 3 will be focused on the screen 1 by the lenses 9. However, the lenses reduce or compress the increments of the picture so that the image cast on the screen by each lens has a width approximately half the width of the lens.

As shown schematically in FIG. 9 the projector 3 comprises a concentrated light source 11 and a condensing lens 12 for illuminating a film F positioned by a film guide 13 having an opening 14 of suitable size for a single frame of film. The projector is provided with suitable shutter and film handling mechanism (not shown) for presenting successive frames of the film to the opening 14 of the film guide. A projection lens 15 is mounted in front of the film in a tube or housing 16 which is movable axially on a support 17 so as to focus the lens 15 on the film. While lenses 12 and 15 have been shown schematically in the drawings as simple convex lenses, it will be understood that in accordance with optical practice, each may consist of two or more elements which may be combined in a single unit or may be spaced apart. In front of the lens 15 there is mounted a light beam spreading unit 18 comprising a light reflecting unit 20 shown in the form of a prism having reflecting surfaces 20a and 20b which are disposed symmetrically and at an angle of approximately 90° to one another so that each is disposed at an angle of 45° to a vertical plane passing through the optical axis of the lens 15. Spaced laterally from the reflecting faces 20a and 20b are reflectors 21a and 21b which are likewise approximately 45° to the central vertical plane of the projector. The reflecting surfaces are so arranged that light rays passing through the left hand portion 15a of the projecting lens 15 are reflected laterally by the reflecting surface 20a and then forwardly by the reflecting surface 21a. In like manner, light rays passing through the right hand portion 15b of the lens 15 are reflected laterally toward the right by the reflecting surface 20b and then forwardly by the reflecting surface 21b. Hence the unit comprising the prism 20 and the reflectors 21a and 21b increases the separation of the light rays passing respectively through the left hand portion and the right hand portion of the lens 15. The prism 20 and reflectors 21a and 21b are conveniently mounted in a housing 22 mounted on the front of the projector, for example by means of a collar 23 which fits over the forward end of the projector lens tube 16 and is secured in selected position by a set screw 24.

Means is preferably provided for varying the lateral distance between the reflectors 21a and 21b and also for varying the angle of inclination of at least one of the reflectors. As illustrated in FIG. 9, the reflector 21a is movable rectilinearly toward and away from the prism 20 by means of a rotatable screw 26 which is rotatably attached to a base portion 27 of the reflector and extends through a threaded opening in a boss 28 provided at one side of the housing 22. The screw 26 is rotatable by means of a knurled knob 29 to move the reflector from an outer position as shown in solid lines to an inner position indicated by broken lines. Any desired range of movement can be provided. When the projector is fairly near the screen as it is for home movies, the distance between the reflectors 21a and 21b is preferably about 3 inches, i.e. approximately the distance between a person's eyes. When the projector is mounted further away from the screen as in large theatres, the distance between the reflectors 21a and 21b is correspondingly increased.

To provide for angular adjustment, the reflector 21b is shown mounted pivotally at 31. A rotatable screw 32 extending through a threaded hole in a boss 33 is rotatable by a knurled knob 34 and has an inner end engaging the reflector 21b to swing it about its pivot. A tension spring 35 holds the reflector in engagement with the screw. The angle of the reflector 21b is adjusted so that light rays projected by the reflectors converge with one another at the grid 2.

The operation of the system will be readily understood by reference to FIGS. 1, 9, 10 and 11. As explained above, a so called "single image" picture actually consists of a plurality of images since each small portion of the camera lens acts as a complete lens and the several portions of the lens are spaced materially from one another. This is particularly true of a "fast" lens which may have a diameter of two inches or more. In like manner the right and left side portions 15a and 15b respectively of the projector lens 15 (FIG. 9) each acts as a separate lens. By reason of their lateral spacing the projection lens portions 15a and 15b view the film frame F from different aspects. Thus the lens portion 15a is nearer to and directly in front of the left hand portion of the film frame while being farther away from and at an angle to the right hand portion of the film frame. The relation of the lens portion 15a to the film thus corresponds to the relation of the left hand portion of the camera lens to the film when the picture was taken.

Light rays L1 passing through the left hand portion 15a of the projection lens 15 are reflected laterally by the reflecting surface 20a and then directed toward the screen by the reflector 21a. In like manner light rays L2 passing through the right hand portion 15b of the projection lens are reflected laterally by the surface 20b and directed forwardly by the reflector 21b. The reflector 21b is adjusted angularly so that the light rays L1 and L2 converge with one another at the grid 2. The light rays L1 pass through the spaces of the grid and form on the screen narrow vertically extending increments P1 of the picture being projected, intervening increments being blocked by the grid strips 4 so that the increments P1 are spaced from one another a distance equal to their width. The light rays L2 pass through the spaces of the grid at a different angle and form on the screen narrow vertically extending increments P2 of the picture being projected. The width of the grid strips 4, the distance of the grid from the screen and the angular relationship of the light rays L1 and L2 are selected so that the increments P2 fit in between the increments P1 and form a continuous picture on the screen.

When the picture thus produced is viewed by an observer, the left eye E1 of the observer sees only the picture increments P1 formed by the light rays L1, increments P2 being blocked by the grid strips 4. The right eye E2 of the observer sees only the picture increments P2 formed by the light rays L2. Thus the left eye sees only the picture projected by the left hand portion 15a of the projector lens 15 while the right eye sees only the picture projected by the right hand portion 15b of the lens. Although the pictures are derived from the same film frame, they are viewed from different angles as pointed out above and hence are not identical. The left eye thus sees the picture from one aspect while the right eye sees it from a slightly different aspect. The difference between the two pictures creates an illusion of depth giving a three dimensional effect to the picture.

A similar effect is obtained with the polarizing grid illustrated in FIGS. 5 and 6 and with the lens grid illustrated in FIGS. 7 and 8. With the polarizing grid, the picture produced by the light rays L1 from the left hand portion of the projection lens comprises narrow spaced vertically extending increments polarized in one direction and intervening increments polarized at 90° to the first. The picture produced by the light rays L2 likewise comprises spaced increments polarized in one direction and intervening increments polarized at an angle of 90°. However, the respective increments projected by the light rays L2 are displaced laterally with respect to those projected by the light rays L1 by reason of the lateral spacing of the reflecting elements 21a and 21b of the projector and the resulting angle between the light rays L1 and L2. An observer viewing the picture through the polarizing screen sees with his left eye only the picture increments produced by the light rays L1, the intervening increments being blocked by intervening strips of the polarizing screen by reason of their being polarized at an angle of 90°. In a similar manner the right eye E2 sees only the picture increments produced by the light rays L2. Thus the two eyes see different aspects of the same picture.

When a lens grid like the grid 2b shown in FIGS. 7 and 8 is used, the light rays L1 shining through the grid produce on the screen a series of narrow vertically extending picture increments which are spaced from one another by reason of the condensing effect of the lenses. The spacing between the increments is approximately equal to their width. The light rays L2 similarly produce narrower vertically extending picture increments which are interposed between the increments produced by the light rays L1. When the picture thus produced is viewed by an observer, the left eye sees only the increments produced by the light rays L1 while the right eye sees only the increments produced by the light rays L2. The picture is thus seen in different aspects by the two eyes of the observer so as to produce an illusion of depth. When using a polarizing grid, the screen 1 should have an aluminized or other surface which reflects light without loss of polarization.

When using a polarizing grid as illustrated in FIGS. 5 and 6 or a lens grid as illustrated in FIGS. 7 and 8 it is desirable to have the surface of the grid coated or otherwise treated to reduce the reflection of light by the grid. Alternatively objectionable reflection is entirely avoided by projecting the picture from the rear of the screen as illustrated for example in FIG. 12. In this arrangement, the projector 3 projects the pictures on the screen 1 from the rear through a grid 2a made up of narrow polarizing strips arranged as illustrated in FIGS. 5 and 6. The picture thus projected is viewed by an observer in front of the screen through a second grid 2a' which is like the grid 2a and has strips of the same width and arrangement. The screen 1 used in this system is a translucent screen suitable for rear projection. The arrangement is such that the left eye E1 of the observer sees the picture as viewed from one side while the right eye E2 sees the picture as viewed from the other side. The two eyes thus see different aspects of the same picture. Lens screens such as that illustrated in FIGS. 7 and 8 may be used in place of the polarizing screens 2a and 2a'.

In FIG. 13 there is shown a further arrangement in which the picture is projected on the screen from the rear. A polarizing screen 2a like that of FIGS. 5 and 6 is placed in front of the screen. A polarizing filter is placed in the path of each of the light rays L1 and L2 for example by being positioned in front of the reflecting elements 21a and 21b of the projector. One of the polarizing filters P1 is polarized in the same direction as alternate strips of the polarizing screen 2a placed in front of the screen 1 while the other polarizing filter P2 is polarized in the same direction as the intervening strips of the grid and hence at an angle of 90° to the first filter. With this arrangement one eye sees narrow vertical increments of the picture projected by the light rays L1 while the other eye sees narrow vertical increments of the picture projected by the light rays L2 so that the eyes thus see the same picture from different aspects.

In all of the arrangements described above, the picture increments are so narrow and so closely spaced that when viewed from the distance that the observer is from the screen they blend together to give the appearance of a complete uninterrupted picture. Moreover, the strips of the grid are sufficiently narrow that if an observer's line of vision does not register exactly with the proper picture increments as viewed through the grid, proper alignment can be readily obtained by the observer slightly shifting his position. The system is thus applicable for use in public theatres as well as for use at home.

Instead of providing polarizing filters F1 and F2 in front of the projector as illustrated in FIG. 13 such filters may be located on or directly in front of the projector lens as illustrated in FIGS. 14 and 15. In this embodiment a projector lens 40 corresponding to the lens 15 of FIG. 9 is divided by an opaque masking element 41 into a left hand portion 40a (as viewed from the rear of the projector) and a right hand portion 40b, the two portions 40a and 40b being spaced laterally from one another. Polarizing filters 42a and 42b are provided in front of the lens portion 40a and 40b respectively. The direction of polarization of one polarizing filter is at right angles to that of the other. For example the direction of polarization may be at an angle of 45° to the vertical as illustrated schematically in FIG. 14. The lens unit illustrated in FIGS. 14 and 15 is preferably used with a reflector system as illustrated in FIG. 9 to obtain greater spacing of the light beams passing through the lens portions 40a and 40b respectively. However, as these lens portions are spaced laterally from one another by reason of the masking element 41, the lens unit may also be used without the reflecting system.

Another form of projector shown schematically in FIGS. 16 and 17 comprises a concentrated light source 51 and a condensing lens 52 for illuminating a film F positioned by a film guide 53 having an opening 54 of suitable size for a single frame of film. The projector is provided with suitable shutter and film handling mechanism (not shown) for presenting successive frames of film to the opening 54 of the film guide. A projection lens 55 is mounted in front of the film in a tube or housing 56 which is movable axially in a support 57 so as to focus the lens 55 on the film. While lenses 52 and 55 have been shown schematically as simple lenses it will be understood that each may consist of two or more elements. A light beam spreading unit 60 mounted in front of the projection lens 55 comprises a housing 61 having a collar 62 which fits over the end of the lens tube 56 and is held in selected position by a set screw 63. Two prisms 64 and 65 in the housing 61 are seated on side cushions 66 and 67 and a central cushion 68 supported by a backing bar 69 that is carried by the housing 61 and extends diametrically across the front end of the lens tube 56. The cushions 66, 67 and 68 are formed of relatively soft rubber or other elastomer material. The prisms 64 and 65 are held against the cushions by a V-shaped bar 70 which is movable toward and away from the central cushion 68 by means of a threaded adjusting screw 71 which extends through a split locking bushing 72 threaded internally and externally and screwed into a central hole in a boss 73 on a removable front cover portion 74 of the housing 61. At opposite sides of the central prisms 64 and 65 there are positioned two additional prisms 76 and 77 which are held between the cover 74 and the side cushions 66 and 67 and have reflecting surfaces 76a and 77a respectively. The prisms 64 and 65 are symmetrical to one another with respect to a central vertical plane passing through the axis of the projection lens 55 and the prisms 66 and 67 are likewise symmetrical. Windows 74a and 74b are provided in the cover 74 in front of the prisms 76 and 77. The prisms 64 and 76 are so arranged that light rays L1 passing through the left hand portion 55a of lens 55 are reflected laterally by the reflecting surface 64a and then forwardly by the reflecting surfaces 76a. Light rays L2 passing through the right hand portion 55 of the lens are similarly reflected by surfaces 65a and 77a. The direction in which the light rays L1 and L2 are projected by the reflecting surfaces is variable by means of the adjusting screw 71. When the screw is screwed inwardly, the bar 70 presses the central edge portions of prisms 64 and 65 inwardly toward the supporting bar 69, movement being permitted by compression of the central cushion 68. The prisms 64 and 65 are thereby rotated about the side cushions 66 and 67 as fulcrums to change the angle of inclination of reflecting surfaces 64a and 65a and thereby change the direction in which the light rays are projected by the light beam spreading unit 60. The locking screw 72 is thereupon tightened to hold the adjusting screw 71 in selected position. The operation of the projector shown in FIG. 16 as thus far described is like that of FIG. 9.

A further feature incorporated in the embodiment of FIG. 16 is an alternating shutter mechanism 80 for use in projecting a film which has been taken or printed in such a way that alternating frames represent right eye views and left eye views respectively of the subject photographed. For example the film may be taken with the camera disclosed in my patent application, S.N. 710,750, filed January 23, 1958. The shutter mechanism is shown as comprising a disc 81 of glass, plastic or other transparent material rotatably supported by a bearing 82 on a central bushing 83 on the front cover 74 of the light beam spreading unit 60. The disc 81 comprises a clear window portion 84 which merges gradually through increasingly opaque transition portions 85 into an opaque portion 86. The window 84 extends less than half way around the disc and is positioned so as to come in front of the windows 74a and 74b as the disc is rotated. Means is provided for rotating the disc is synchronism with the film transport mechanism of the projector so that when a film frame corresponding to a left eye view is positioned in the opening of the film guide 53 the window 84 of the disc is in front of the prism 76 and when the next frame representing a right eye view is exposed, the window of the disc is in front of the prism 77. Both windows are covered while the film is being advanced. Means for rotating the disc is illustrated as comprising a gear tooth rim 87 on the disc engaging a pinion 88 on a shaft 89 which is connected with the drive of the film transport mechanism of the projector.

When the projector shown in FIG. 16 is used with a screen and grid combination in accordance with the present invention as described above, the picture produced by light rays passing through the left hand window 74a are seen only by the left eye of an observer and a picture produced by light rays passing through the window 74b are seen only by the right eye. Hence with the alternating shutter unit 80 the left eye views and the right eye views are projected alternately and each is seen only by the eye for which it is intended. It has been found that by reason of the interaction of the two eyes there is no flickering even though each eye sees only 13 or 14 frames a second. Hence it is sufficient to run the projector at a speed of approximately 26 or 28 frames a second.

Alternatively the projector of FIG. 16 can be used to project "single image" film. In this event the shutter mechanism 80 is operated more slowly for example two cycles per second, so that the pictures projected respectively through the right and left windows are alternately faded in and out. If the film is taken with the camera of my application S.N. 710,750 the projector is preferably synchronized so that the right window is open when showing a picture taken with the viewing element of the camera on its right hand portion. This is suitably effected by suitable control indicia recorded on the film.

A projector for projecting stereoscopic slides is illustrated schematically in FIG. 18. The projector comprises a lamp 91, condensing lens 92, slide holder 93 and a projection lens unit 95 mounted in a suitable tube or housing 96. The slide holder 93 is reciprocable along a suitable guide or track 97 and is adapted to hold two frames or a dual frame comprising a picture F1 which is a left eye view and a picture F2 which is a right eye view of the same subject. In front of the projection lens unit 95 there is mounted a light beam spreading unit 100 which may be like the unit 18 of FIG. 9 or the unit 60 of FIG. 16 but has been shown in simplified form with fixed reflecting surfaces arranged to direct the respective light beams laterally apart from one another and then forwardly. The unit 100 comprises a housing 101. On the front of the housing there is mounted a slidable shutter element 102 which is reciprocable between a right hand position in which it exposes a left hand window 103a and a left hand position in which it exposes a right hand window 103b. Means is provided for reciprocating the slide holder 93 and the shutter 102 in synchronism with one another so that when frame F1 of the picture is being projected, the left hand window 103a is open and when frame F2 is being projected, the window 103b is open. Suitable operating mechanism is shown schematically as comprising a rotatably supported shaft 105. An arm 106 fixed on the shaft 105 is provided near its outer end with an elongated slot 107 receiving a stud 108 on an upward extension 93a of the slide carrier 93. A second arm 109 fixed on the shaft 105 is provided near its end with an elongated slot 110 receiving a stud 111 on an upward extension 102a of the reciprocable shutter 102. A third arm 112 fixed on the shaft 105 has adjacent its end a pin or roller 113 received in a cam track 114 of a cam disc 115 mounted on a shaft 116 which is suitably supported for rotation and driven by a motor or other driving means (not shown). The cam track 114 comprises an inner portion 114a concentric with the shaft 116 but of greater radius and transitional portions 114c connecting the portions 114a and 114b. As the cam disc 115 rotates at a selected constant speed, the shaft 105 is oscillated to reciprocate the slide carrier 93 and the shutter 102 between the left hand positions shown in solid lines and right hand positions indicated in broken lines. The cam disc 115 is preferably rotated at a speed of approximately 14 revolutions per second so that each frame is shown 14 times. This results in showing a total of 28 frames per second which is sufficient to avoid flicker. When the projector of FIG. 18 is used with a screen and grid combination in accordance with the invention, the picture produced by the left hand frame is seen only by the left eye of an observer and the picture produced by the right hand frame is seen only by the right eye of the observer as explained above. As the two pictures differ slightly from one another, one corresponding to the subject as viewed by the left eye and the other by the right eye, a stereoscopic effect is obtained.

The shutter mechanism of FIGS. 16 and 17 or 18 may be used with a projector having two parallel lens systems for projecting pictures corresponding respectively to left eye views and right eye views onto a screen provided with a grid according to FIGS. 3 to 8. The shutter is preferably operated at such speed that the left eye picture is shown 12 to 14 times a second in alternation with the right eye picture which is likewise shown 12 to 14 lines a second. The lateral spacing of the two parallel lens systems, the distance from the projector to the screen and the arrangement of the screen and grid are selected so that the left eye of an observer sees the left eye picture and the right eye of the observer sees the right eye picture. As the period between successive pictures seen by each eye is greater than the period of optical persistence, each eye "forgets" the preceding image before the next one is shown. Moreover, because of the operation of the shutter, the left eye and the right eye see the respective left and right pictures successively rather than simultaneously. This avoids the parallax effect resulting from the fact that the left and right pictures were taken from laterally spaced positions. At the same time the successive showing of the right and left pictures at a total rate of 24 to 28 frames per second avoids perceptible flicker even though each picture is shown at only half that rate.

FIGS. 19 to 21 show another form of projector comprising a concentrated light scource 121 and a condensing lens 122 for illuminating a film F positioned by a film guide 123 having an opening 124 of suitable size for a single frame of film. The projector is provided with suitable shutter and film handling mechanism (not shown) for presenting successive frames of film to the opening 124 of the film guide. A projecting lens 125 is mounted in front of the film in a tube or housing 126 which is movable axially in a support 127 so as to focus the lens 125 on the film. A light beam spreading unit 130 mounted in front of the projection lens 125 comprises a housing 131 having a collar 132 which fits over the end of the lens tube 126 and is held in selected position by a set screw 133. The housing 131 is of trapezoidal shape in plan and is provided with plane surfaces 135 and 136 disposed respectively at the right and left sides of the housing and oppositely inclined at angles of 45° to the axis of the lens tube 126. The housing 131 has a removable cover 137 having apertures providing a left hand window 138 in front of the reflecting surface 135 and a right hand window 139 in front of the reflecting surface 136. A movable reflecting element 140 is mounted in the housing 131 so as to be reciprocable between a left hand position as shown in solid lines and a right hand position as indicated in broken lines. The reflecting element 140 is shown as comprising a prism having a reflecting surface 141 parallel to the reflecting surface 135 of the housing 131 and a reflecting surface 142 parallel to the surface 136 of the housing. Guide pins 143 and 144 sliding respectively in slots or grooves 145 and 146 in the housing 131 guide the reflecting element 140 during its reciprocation. In the left hand position of the reflecting element 140 as shown in solid lines, the reflecting surface 142 is in front of the lens tube 126. Light rays from the illuminated frame of the film F pass through the lens 125, are directed laterally by the reflecting surface 142 of the element 140 and are then directed forwardly out through the window 139 by the reflecting surface 136. When the element 140 is in its right hand position as shown in dotted lines, light projected through the lens 125 is similarly reflected by surfaces 141 and 135 and directed out through the left hand window 138. The projector is preferably used with a screen and grid system as described above.

Actuating means is provided for cyclically moving the reflecting element 140 from one position to another. As illustrated in the drawings, the actuating means comprises two arms 151 pivotally swingable about diametrically opposite trunnions 152 on the support 127 and having slotted outer end portions engaging stub shafts 153 provided opposite one another on the upper and lower sides of the element 140 and extending out through slots 154 in the housing 131. A spool 155, rotatably mounted to turn about a vertical axis, is provided on its upper and lower ends with eccentric crank pins 156 connected by connecting rods 157 to intermediate portions of the arms 151, the connecting rods being pivotally connected to the arms 151 at 158. Means is provided for rotating the spool 155 at a selected speed. The spool may, for example, be driven from the regular driving mechanism of the projector. By way of example it is shown as being driven by an electric motor 160 through a worm shaft 161 engaging a worm gear 162 on the spool. It will be seen that as the spool is rotated by the motor, the reflecting element 140 is reciprocated by the arms 151. As arms 151 are provided at opposite sides of the reflecting element 140 and as the pivotal connections 153 between the arms and the reflecting element are located approximately on a line passing through the center of mass of said element, the element 140 is reciprocated smoothly and is guided by the guide pins 143 and 144 so as to reciprocate without angular movement.

The projector shown in FIGS. 19 to 21 is capable of two different modes of operation. In projecting "single image" film—as distinguished from stereoscopic film having right and left images—the reflecting element is moved slowly for example at a rate of the order of 2 cycles per second. Hence as successive frames of the film are projected, for example at a rate of 24 frames per second, the pictures are projected through the right hand window when the reflecting element 140 is in the position shown in solid lines and through the left hand window when the reflecting element is in its right hand position as shown in broken lines, with intermediate pictures projected partially through one window and partially through the other. By reason of the grid and screen arrangement as described above pictures projected through the left window are seen by the left eye of an observer and pictures projected through the right window are seen by the right eye. Hence movement of the reflecting element back and forth produces somewhat the same effect as a person viewing an object first with one eye and then with the other and thereby produces an illusion of depth.

In projecting a film composed alternately of left eye views and right eye views as described above, the reflecting element 140 is reciprocated at a rate of for example 14 cycles per second in synchronism with the film handling mechanism of the projector so that left eye pictures are projected through the left window 138 and right eye pictures are projected through the window 139. Although each eye thus sees only 14 frames a second, it has been found that there is no perceptible flicker since the two eyes receive 28 frames per second. Since the left eye of an observer sees the left eye pictures and the right eye of an observer sees the right eye pictures, a 3 dimensional effect is obtained.

It will be understood that the several features of the various embodiments of the invention herein shown and described are mutually interchangeable insofar as they are compatible with one another. Moreover, it will be recognized by those skilled in the art that still other modifications may be made, the illustrated embodiments being shown and described merely by way of example.

What I claim and desire to secure by Letters Patent is:

1. A projection system for projecting motion pictures, comprising a projector, a screen and a stationary grid disposed near said screen and between said projector and screen, said grid comprising a multiplicity of parallel vertically extending narrow strips of light absorbing material, said strips lying substantially in a plane and being separated by spaces of substantially the same width as said strips, said projector comprising film handling means for presenting successive frames of film to be projected, means for illuminating said frames successively and projecting means for simultaneously projecting through said grid and onto said screen a first image of a single picture in an individual frame of said film as viewed from a selected first angle and a second image of the same single picture in said individual frame as viewed from selected second angle different from said first angle, said projecting means comprising two horizontally spaced lens portions receiving light simultaneously from said frame and directing light toward said screen along separate horizontally spaced and angularly converging paths, one of said lens portions being substantially in front of one side portion of said single picture in said individual frame and at a substantial angle to and spaced further from the opposite side portion of said picture and the other of said lens portions being substantially in front of said opposite side portion of said single picture in said individual frame and at a substantial angle to and spaced further from said one side portion of said picture, and reflecting means closely in front of said lens portions for receiving light from said lens portions and directing it horizontally outwardly and then forwardly toward the screen to increase the horizontal distance between said paths as the light leaves the projector, said paths converging substantially at said grid, the light projected by said one lens portion passing through said grid at an angle to produce said first image on a first series of spaced parallel vertical bands of said screen and the light projected by said other lens portion passing through said grid at a different angle to produce said second image on a second series of spaced parallel vertical bands of said screen, said second series of spaced bands substantially filling the spaces on said screen between the bands of said second series, said grid permitting one eye of a viewer to see said first series of bands only and permitting the other eye of said viewer to see said second series of bands only, whereby one eye sees said first image only and the other eye sees said second image only to give an illusion of depth to the picture being viewed.

2. A projection system according to claim 1, in which said projector further comprises means for varying the spacing between said paths.

3. A projection system according to claim 1, in which said projector further comprises means for varying the angular relationship between said angularly converging paths.

4. A projection system for projecting motion pictures, comprising a projector, a screen and a stationary grid disposed near said screen and between said projector and screen, said projector comprising film handling means for presenting successive frames of film to be projected, means for illuminating said frames successively and projecting means for simultaneously projecting through said grid and onto said screen a first image of a single picture in an individual frame of said film as viewed from a selected first angle and a second image of the same single picture in said individual frame as viewed from a selected second angle different from said first angle, said projecting means comprising two horizontally spaced lens portions receiving light simultaneously from said frame and directing light toward said screen along separate horizontally spaced and angularly converging paths, one of said lens portions being substantially in front of one side portion of said single picture in said individual frame and at a substantial angle to and spaced further from the opposite side portion of said picture and the other of said lens portions being substantially in front of said opposite side portion of said single picture in said individual frame and at a substantial angle to and spaced further from said one side portion of said picture, and reflecting means closely in front of said lens portions for receiving light from said lens portions and directing it horizontally outwardly and then forwardly toward the screen to increase the horizontal distance between said paths as the light leaves the projector, said paths converging substantially at said grid, and said grid comprising a multiplicity of narrow vertically extending parti-cylindrical lenses disposed parallel to one another, said lenses of the grid receiving light directed along one of said paths and focusing it on said screen in a first series of spaced parallel bands to produce on the screen said first image, the width of said bands being substantially equal to the spacing between said bands, and said lenses of the grid also receiving light directed along the other of said paths at a different angle and focusing it on said screen in a second series of like bands interposed between the bands of said first series and thereby producing on said screen said second image, said grid also directing light reflected from the screen to permit one eye of a viewer to see said first series of bands only and permitting the other eye of said viewer to see said second series of bands only, whereby one eye sees said first image only and the other eye sees said second image only to give an illusion of depth to the picture being viewed.

References Cited in the file of this patent

UNITED STATES PATENTS

| | | |
|---|---|---|
| 1,334,532 | Griffith | Mar. 23, 1920 |
| 1,498,177 | Leonard | June 17, 1924 |
| 2,100,634 | Coffey | Nov. 30, 1937 |
| 2,307,276 | Keyzer | Jan. 5, 1943 |
| 2,401,271 | Pi Suner | May 28, 1946 |
| 2,550,350 | Henson | Apr. 24, 1951 |
| 2,617,329 | Dreyer | Nov. 11, 1952 |
| 2,647,440 | Rehorn | Aug. 4, 1953 |
| 2,674,919 | Rodriguez | Apr. 13, 1954 |
| 2,683,389 | Wright | July 13, 1954 |

FOREIGN PATENTS

| | | |
|---|---|---|
| 417,211 | France | June 16, 1910 |
| 443,216 | France | Sept. 19, 1912 |

OTHER REFERENCES

"Three Dimensional Photography" (McKay), Jones Press, Inc., 1951; pages 2–3 and 204–209.

"Introduction to 3–D" (Dewhurst), Chapman & Hall, Ltd., 1954; pages 60–62.